July 5, 1949. D. ADAMS 2,475,302
MOTOR MOUNTING
Filed Sept. 18, 1947
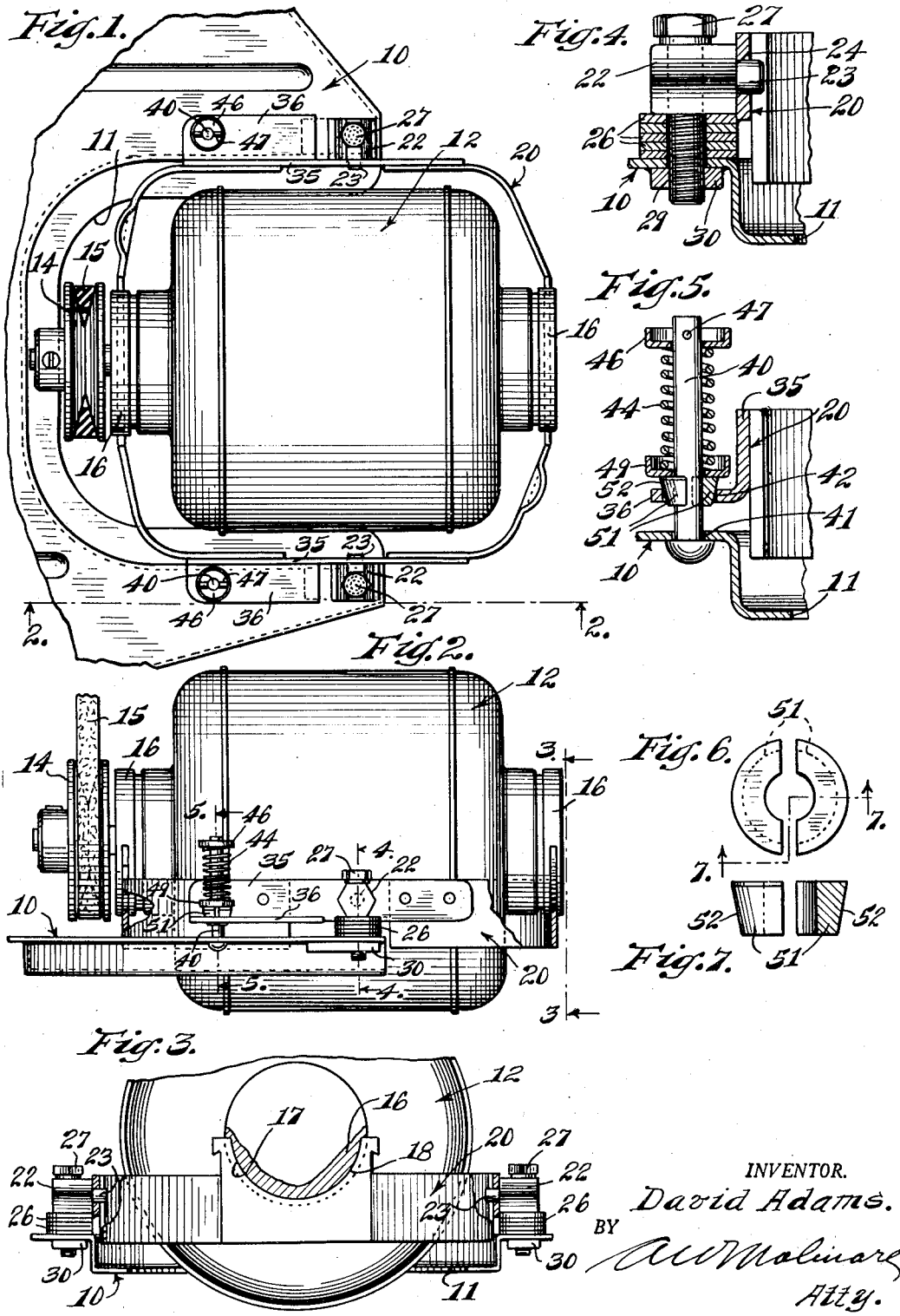
INVENTOR.
David Adams.
BY
Atty.

Patented July 5, 1949

2,475,302

UNITED STATES PATENT OFFICE 2,475,302

MOTOR MOUNTING

David Adams, Brookfield, Ill., assignor to Thor Corporation, Chicago, Ill., a corporation of Illinois Application September 18, 1947, Serial No. 774,836

9 Claims. (Cl. 248—16)

1

The present invention relates to a novel mounting for electric motors when used for driving other mechanism through the medium of pulleys and a belt. Heretofore, in order to provide an efficient drive, various forms of take-up devices have been employed which add considerable to the cost of the total apparatus. Moreover, in certain installations, such as in connection with present day types of washing machines, the motor and some or all of the driving mechanism are movably mounted to accommodate vibratory and gyratory movements of certain operating parts of the machine. While it is possible to rigidly mount the motor with respect to the mechanism to be driven thereby, it has been found that great difficulties result from such mountings, as well as reduced efficiency in transmission of power, due to slight inaccuracies in the length, as well as the width of tapered belts, sometimes termed V belts, that are usually employed, as well as possible slight inaccuracies in the pulleys employed.

The primary object of the present invention, is to provide a novel motor mounting which readily compensates for inaccuracies in size of the belt and pulleys employed in the transmission of power from the motor to the mechanism to be driven.

Another object is to provide a novel motor mounting which automatically adjusts the motor to a proper position relatively to the belt so as to insure an efficient drive.

A further object is to provide a novel motor mounting, wherein the motor is pivotally supported on an axis transverse to the motor axis, adjacent to and at one side of the center of gravity of the motor, to provide a counter balance for the major portion of the overhanging weight of the opposite end of the motor, together with spring means, which together with the pivotal mounting, provides a movable, yieldable support for the motor.

Still another object, is to provide a novel motor support, including a yieldable suspension, together with means for snubbing vibration set up in the yieldable suspension.

And a still further object, is to provide a novel and improved motor mounting which insures an efficient drive, which is durable in operation, and which may be economically manufactured.

Other objects and advantages of the present invention will be apparent from the following description, taken in connection with the accompanying drawing in which:

Fig. 1 is a plan view of the motor mounting embodying the present invention.

2

Fig. 2 is a view part elevation and part in section, taken substantially as indicated at line 2—2 on Fig. 1.

Fig. 3 is an outer end elevational view of the motor and the novel mounting.

Fig. 4 is an enlarged sectional view through the pivotal mounting, taken substantially as indicated at line 4—4 on Fig. 2.

Fig. 5 is an enlarged sectional view through the yieldable suspension taken substantially as indicated at line 5—5 on Fig. 2.

Fig. 6 is an enlarged plan view of a pair of elements constituting the snubber device, with the elements shown in operative relation to each other.

Fig. 7 is a view part in section and part elevation of the snubbed elements taken substantially as indicated at line 7—7 on Fig. 6.

In the drawing, the novel mounting for the motor is shown as applied to an auxiliary frame of a domestic washing machine. The frame which is indicated generally at 10, is preferably though not essentially so, formed as a sheet metal stamping, suitably reinforced with down turned flanges and embossed ribs. The frame is formed with a generally U-shaped opening 11 to accommodate an electric motor, indicated generally at 12, for providing a compact arrangement and assembly. One end of the motor is provided with a driving pulley 14, which through the medium of a V belt 15, is adapted to drive a pulley associated with driving mechanisms (not shown).

The motor is provided at opposite ends with outboard bearings 16, formed with suitable grooves 17, for seating in generally semi-circular supports 18, at the ends of a generally rectangular shaped cradle 20, surrounding the motor.

The cradle, together with the motor, are supported on the frame 10, on a substantially horizontal axis, transverse of the motor axis, and adjacent and slightly to one side of the center of gravity of the motor and cradle, the pivot axis being at the end portion opposite the drive end of the motor. Each of the pivotal connections, at the respective sides of the cradle, consist of a block 22, having a reduced end, forming a trunnion 23, seated in an opening 24, formed in the side of the cradle 20, as seen in Fig. 4 of the drawings.

The pivot blocks are supported on the frame 10, and may be shimmed to a desired height with respect to the frame to initially position the motor in proper relation to the mechanism to be driven, to obtain proper tension in the drive belt 15. As seen in Fig. 4, the pivot block 22 is shimmed with respect to the frame by means of a multiplicity of washers 26. The pivot block is connected to the frame 10 by means of a threaded stud 27, extending vertically through the body of the block and the stack of washers, and the frame and its lower end being threaded into a tapped hole 29, formed in a plate 30, which is welded to the under side of the frame; 10. The loose fit between the stud 27 and the pivot block 22 affords slight lateral adjustment of the cradle and motor, so as to insure proper and free pivotal support thereof.

It will be apparent that due to the location of the pivotal axis of the cradle and motor, the overhanging weight at the drive end of the motor tends to cause the cradle and motor to swing at said end in a downwardly direction.

The cradle is provided at each of its opposite sides with a side bar 35, having a horizontally extending leg 36, located intermediate the pivotal connection, and the drive end of the motor. Resilient suspension means is provided at opposite sides of the forward or drive end of the motor to support the overhanging weight of the cradle and motor. Each of the resilient suspension means comprises a headed pin 40 projected upwardly through a large size opening 41 in the frame 10, as seen in Fig. 5 of the drawing, and the pin extending upwardly through and in spaced relation with respect to the marginal edges of a relatively large circular opening 42, formed in the horizontal leg 36 of the cradle side member 35. Surrounding the upper end of the pin 40, is a coil spring 44, the upper end of which reacts against an upwardly facing cup-shaped washer 46, confined in position by a retaining pin 47, extending through the pin 40. The lower end of the spring abuts against a similarly disposed cup-shaped washer 49, which is seated upon a snubber device composed of two co-operating wedge elements 51, of generally semi-annular form, disposed in surrounding relation to the pin 40 and adapted to co-act with the marginal edge of the opening 42, formed in the horizontal leg 36 of the side bar 35, of the cradle. Each of the snubber elements 51, has its outer wall downwardly tapered as indicated at 52, so as to function in a wedging manner in the opening 42 of said horizontal leg of the cradle side bar.

The purpose of the arrangement of the upper cup-shaped washer 46, and the retaining pin 47, is to facilitate assembly and dis-assembly of the resilient suspension devices and snubber devices in association with the cradle and the supporting frame 10.

It will now be seen that the spring suspension arrangement as shown and described, is such that the springs of each of the suspension devices tend to exert a force in the same downwardly direction as the unbalanced overhanging weight of the motor and cradle. However, the force of the spring is transmitted directly to the wedges of the snubbing devices, and tend to cramp them downwardly into the opening 42 in the horizontal leg 36 of the side bar 35, of the cradle. In other words, the springs 44 assist or augment the overhanging weight of the motor and cradle to impose adequate tension on the drive belt 15, so as to accommodate all slight irregularities in length or width of said drive belt and pulleys for insuring an efficient drive at all times.

Because in machines subject to vibration and gyratory motion of parts, such as in centrifuging machines used as extractors for removing water from clothes, there is a tendency in employing a resilient suspension for the motor, to set up a vibratory action in the motor support, which tends to greatly reduce the efficiency of the drive from the motor to the mechanism to be driven. When such vibratory motion has a tendency to be set up in the present spring suspension, the wedge elements 51 are caused to be cramped or wedged into the opening 42, and thereby firmly embrace the pins 40, and serve somewhat in the nature of a brake and effect a snubbing and damping action on such vibratory or pulsating motion, which may be set up in the resilient suspension devices. As the amplitude of vibration or pulsation in the spring suspension is reduced and retarded, the pressure or force exerted by the springs on the wedges 51, is reduced and the wedges thereby again assume a normal position to permit slight freedom of movement of the pins 40 therein. It will be apparent that in the event of vibration, there is a tendency for the motor and cradle, at the drive end, to raise upwardly, and which movement is opposed by the engagement of the wedge elements in the opening in the horizontal leg 36, of the cradle side bar, and an excessive downward movement of the drive end of the motor is immediately followed up by the wedge elements, due to the force of the spring acting directly thereon. By virtue of this construction, the motor and its cradle mounting at all times is under proper control to maintain an efficient drive through the belt 15 to the driven mechanism, irrespective of the vibration or gyratory movement of parts of the machine, including the motor and/or the driven mechanism.

Although I have herein shown and described certain embodiments of my invention, manifestly it is capable of modification and re-arrangement of parts without departing from the spirit and scope thereof. I do not, therefore, wish to be understood as limiting this invention to the precise embodiment herein disclosed, except as I may be so limited by the appended claims.

I claim:

1. In combination, a frame, a drive motor, a cradle operably connected to and serving as a support for said motor, means pivotally supporting the cradle, with said motor therein on the frame, on an axis transversely of the motor axis, said pivot axis being located adjacent and to one side of the center of gravity of the motor, whereby to counterbalance the major portion of the overhanging weight of the opposite end of the motor, and spring means acting on the cradle at a position tending to rotate the cradle and motor about its pivotal mounting, in the same direction as caused by the unbalanced weight of the motor.

2. In combination, a frame, a drive motor, a cradle operably connected to and serving as a support for said motor, means pivotally supporting the cradle, with said motor therein on the frame, on an axis transversely of the motor axis, said pivot axis being located adjacent and to one side of the center of gravity of the motor, at the end opposite the driving end of said motor, whereby to counterbalance the major portion of the overhanging weight of the driving end of the motor, and spring means acting on the cradle at a position tending to rotate the cradle and motor about its pivotal mounting, in the same direction as caused by the unbalanced weight of the motor.

3. In combination, a frame, a drive motor, a cradle operably connected to and serving as a support for said motor, means pivotally supporting the cradle, with said motor therein on the frame, on an axis transversely of the motor axis, said pivot axis being located adjacent and to one side of the center of gravity of the motor, whereby to counterbalance the major portion of the overhanging weight of the opposite end of the motor, and spring means, interposed between the cradle and frame and acting on the cradle at a position tending to rotate the cradle and motor about its pivotal mounting, in the same direction as caused by the unbalanced weight of the motor.

4. In combination, a frame, a drive motor, a cradle operably connected to and serving as a support for said motor, means pivotally supporting the cradle, with said motor therein on the frame, on an axis transversely of the motor axis, said pivot axis being located adjacent and to one side of the center of gravity of the motor, whereby to counterbalance the major portion of the overhanging weight of the opposite end of the motor, spring means acting on the cradle at a position tending to rotate the cradle and motor about its pivotal mounting, in the same direction as caused by the unbalanced weight of the motor, and means operably associated with said spring means for snubbing the vibratory movement of the motor about its pivotal mounting.

5. In combination, a frame, a drive motor, a cradle operably connected to and serving as a support for said motor, means pivotally supporting the cradle with the motor therein on the frame, on an axis transversely of the motor axis, said pivot axis being located adjacent and to one side of the center of gravity of the motor, whereby to counterbalance the major portion of the overhanging weight of the opposite end of the motor, and spring devices, interposed between the cradle and frame, at opposite sides of the motor, at said opposite end, to augment the unbalanced weight of the motor and cradle, said spring devices each comprising a pin interconnecting the frame and cradle, and a coil spring surrounding said pin and acting on the cradle to urge the latter and motor in a direction, relative to the pivot axis, corresponding to the direction of force tending to rotate said cradle and motor by said unbalanced weight.

6. In combination, a frame, a drive motor, a cradle operably connected to and serving as a support for said motor, means pivotally supporting the cradle with the motor therein on the frame, on an axis transversely of the motor axis, said pivot axis being located adjacent and to one side of the center of gravity of the motor, whereby to counterbalance the major portion of the overhanging weight of the opposite end of the motor, spring devices, interposed between the cradle and frame, at opposite sides of the motor, at said opposite end, to augment the unbalanced weight of the motor and cradle, said spring devices each comprising a pin interconnecting the frame and cradle, and a coil spring surrounding said pin and acting on the cradle to urge the latter and motor in a direction, relative to the pivot axis, corresponding to the direction of force tending to rotate said cradle and motor by said unbalanced weight, and snubber devices carried on said pin of each device, and coacting with the cradle for snubbing vibratory motion of the cradle and motor about said pivot axis.

7. In combination, a frame, a drive motor, a cradle operably connected to and serving as a support for said motor, means pivotally supporting the cradle with the motor therein on the frame, on an axis transversely of the motor axis, said pivot axis being located adjacent and to one side of the center of gravity of the motor, whereby to counterbalance the major portion of the overhanging weight of the opposite end of the motor, spring devices, interposed between the cradle and frame, at opposite sides of the motor, at said opposite end, to augment the unbalanced weight of the motor and cradle, said spring devices each comprising a pin interconnecting the frame and cradle, and a coil spring surrounding said pin and acting on the cradle to urge the latter and motor in a direction, relative to the pivot axis, corresponding to the direction of force tending to rotate said cradle and motor by said unbalanced weight, and snubber devices carried on said pin of each device, and coacting with the cradle for snubbing vibratory motion of the cradle and motor about said pivot axis, said snubber devices each comprising a means having a generally conical surface, coacting with an aperture in the cradle, and adapted to grip said pin by being contracted in said aperture, in response to movement in the direction of said force of the unbalanced weight.

8. In combination, a frame, a drive motor, a cradle operably connected to and serving as a support for said motor, means pivotally supporting the cradle with the motor therein on the frame, on an axis transversely of the motor axis, said pivot axis being located adjacent and to one side of the center of gravity of the motor, whereby to counterbalance the major portion of the overhanging weight of the opposite end of the motor, spring devices, interposed between the cradle and frame, at opposite sides of the motor, at said opposite end, to augment the unbalanced weight of the motor and cradle, said spring devices each comprising a pin interconnecting the frame and cradle, and a coil spring surrounding said pin and acting on the cradle to urge the latter and motor in a direction, relative to the pivot axis, corresponding to the direction of force tending to rotate said cradle and motor by said unbalanced weight, and snubber devices carried on said pin of each device, and coacting with the cradle for snubbing vibratory motion of the cradle and motor about said pivot axis, said snubber devices each comprising a plurality of movable elements arranged around said pin, and having external tapered surfaces for coaction in an aperture in the cradle and adapted upon excess movement of the cradle and motor in the said direction of movement of the unbalanced weight thereof, to bend upon said pin for dampening vibration and tending to limit such excess movement.

9. In combination, a frame, a drive motor, a cradle operably connected to and serving as a support for said motor, means pivotally supporting the cradle with the motor therein on the frame, on an axis transversely of the motor axis, said pivot axis being located adjacent and to one side of the center of gravity of the motor, whereby to counterbalance the major portion of the overhanging weight of the opposite end of the motor, spring devices, interposed between the cradle and frame, at opposite sides of the motor, at said opposite end, to augment the unbalanced weight of the motor and cradle, said spring devices each comprising a pin interconnecting the frame and cradle, and a coil spring surrounding said pin and acting on the cradle to urge the latter and motor in a direction, relative to the pivot axis, corresponding to the direction of force tending to rotate said cradle and motor by said unbalanced weight, and snubber devices carried on said pin of each device, and coacting with the cradle for snubbing vibratory motion of the cradle and motor about said pivot axis, said snubber devices each comprising a plurality of separate segments, arranged in spaced apart circumferential relation around said pin, and having external tapered surfaces for coaction in an aperture in the cradle and adapted upon excess movement of the cradle and motor in the said direction of movement of the unbalanced weight thereof, to bend upon said pin for dampening vibration and tending to limit such excess movement.

DAVID ADAMS.

REFERENCES CITED

The following references are of record in the file of this patent:

UNITED STATES PATENTS

| Number | Name | Date |
| --- | --- | --- |
| 615,905 | Richards | Dec. 13, 1898 |
| 1,632,261 | Woodrow | June 14, 1927 |
| 2,209,862 | Trott | July 30, 1940 |
| 2,235,972 | Zimmerman | Mar. 25, 1941 |